United States Patent
Deibel et al.

(10) Patent No.: US 6,358,599 B1
(45) Date of Patent: Mar. 19, 2002

(54) ALKENYL AROMATIC POLYMER FOAM LAMINATES

(75) Inventors: Ronald D. Deibel, Midland; Susan E. Dollinger, Saginaw, both of MI (US); Bharat I. Chaudhary, Pearland, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/560,123

(22) Filed: Apr. 28, 2000

Related U.S. Application Data

(60) Provisional application No. 60/131,907, filed on Apr. 30, 1999, and provisional application No. 60/164,693, filed on Nov. 10, 1999.

(51) Int. Cl.[7] .............................. B32B 5/14; B32B 7/02
(52) U.S. Cl. ................................ 428/308.4; 428/319.3; 428/319.7; 428/319.9; 428/220
(58) Field of Search .............. 428/308.4, 319.3, 428/319.7, 319.9, 220

(56) References Cited

U.S. PATENT DOCUMENTS

| | | | |
|---|---|---|---|
| 4,795,763 A | 1/1989 | Gluck et al. | 521/99 |
| 5,695,870 A | 12/1997 | Kelch et al. | 428/318.4 |
| 5,703,187 A | 12/1997 | Timmers | 526/282 |
| 5,872,201 A | 2/1999 | Cheung et al. | 526/282 |
| 6,231,795 B1 * | 5/2001 | Chaudhary et al. | 264/53 |

FOREIGN PATENT DOCUMENTS

| | | | |
|---|---|---|---|
| EP | 0 416 815 | 8/1997 | C07F/7/10 |

OTHER PUBLICATIONS

*Plastic Foams*, Part II; Frisch et al, pp. 544–585, Marcel Dekker, Inc., 1973.
*Plastic Materials*, Brydson, 5th edition, pp. 426–429, Butterworths, 1989.

* cited by examiner

Primary Examiner—Blaine Copenheaver
Assistant Examiner—Hai Vo

(57) ABSTRACT

Adhere a polymer blend facer to at least one, preferably both, primary surfaces of a foam panel or board to provide a laminate with a combination of enhanced strength and resistance to bending relative to the foam panel. The polymer blend facer, prepared from a combination of an alkenyl aromatic polymer and an interpolymer of ethylene, an alkenyl aromatic monomer or hindered aliphatic or cycloaliphatic vinylidene monomer, provides an added benefit in terms of greater recyclability into a foam panel relative to biaxially oriented polypropylene. The polymer blend facer may be a film or a thin foam sheet.

13 Claims, 1 Drawing Sheet

ALKENYL AROMATIC POLYMER FOAM LAMINATES

CROSS-REFERENCE TO RELATED APPLICATION

This application is a continuation in part of U.S. Ser. No. 60/131,907, filed Apr. 30, 1999, titled ALKENYL AROMATIC POLYMER FOAM LAMINATES, and U.S. Ser. No. 60/164,693, filed Nov. 10, 19999, titled COMPOSITE COMPOSITION OF PLASTIC FOAM AND ESI-CONTAINING FACER, now pending in the United States Patent and Trademark Office.

FIELD OF THE INVENTION

This invention generally relates to alkenyl aromatic polymer foam laminates, and in particular to alkenyl aromatic polymer foam laminates that have a facer adhered to at least one, preferably both, major planar surfaces of an alkenyl aromatic polymer foam core. The resulting laminates exhibit improved stiffness and impact resistance relative to the alkenyl aromatic polymer foam core alone. The invention relates more particularly to alkenyl polymer foam laminates wherein the facer has an enhanced recyclability into the foam core relative to oriented polypropylene (OPP) film facers. The invention relates still more particularly to alkenyl polymer foam laminates that include an amount of recycled material.

BACKGROUND OF THE INVENTION

In an attempt to improve thermal insulation of various building structures, common construction practice applies relatively thin (one-quarter inch or 6.4 millimeters (mm) to two inches (55 mm)) rectangular panels of foam board to of building structure walls. The building trade refers to such panels as "residential foam sheathing". Foam boards employed in such applications include those of extruded polystyrene foam, molded expanded polystyrene foam (also known as "MEPS"), and polyisocyanurate foam.

The thin foam boards, while improving thermal insulation performance of a building structure wall, are prone to physical damage from bending, impact, or breaking. Such damage may occur by a variety of means including acts of vandalism, high velocity winds, and construction practices. Ladders that lean against vertical walls tend to bend or break attached foam boards, especially with the added weight of construction personnel. Construction personnel who kneel upon foam boards attached to horizontal walls while such walls are being assembled prior to vertical erection also cause damage.

One proposal to lessen, if not eliminate, such physical damage involves applying a facing material (also known as a "facer") to at least one major planar or primary surface of a foam board to provide additional strength. Examples of such facing materials include thermoplastic films, metal foil, paper or thin cellulose films, non-woven polymeric fabrics, fiberglass scrims, and combinations of the foregoing. Extruded polystyrene and MEPS foam boards commercially use a thermoplastic film as facing material. Commercially used facing materials for extruded polystyrene, MEPS, and polyisocyanurate foam boards include metal foil, paper, fiberglass scrims, and combinations thereof.

The various facing materials have their own unique advantages and disadvantages. Plastic film has the advantage of easy application, economical cost, and optional transparency. Metal foil has the advantages of easy application, vapor barrier resistance and infrared and ultraviolet reflectivity. Fiberglass scrim has the advantage of excellent strength, but is relatively expensive, and causes a significant amount of itching and discomfort to construction personnel during installation. Metal foil can be easily punctured, and may have a very reflective surface that reflects sunlight back into the faces of those installing the insulation. Plastic film facers can be less effective in adding strength and stiffness to the foam.

Applying a thermoplastic facer film to polystyrene foam boards used in residential sheathing applications provides some help, but leaves the resulting laminates subject to fracture problems from bending and impact. One explanation for the fracture problems suggests that the boards lack sufficient thickness in that they typically range in thickness from 0.5 inch (12.7 mm) to 1.0 inch (25 mm). In addition, the facer films may be too thin (from 0.5 mil (13 micrometers ($\mu$m) to about 2.0 mils (50 $\mu$m)) and have insufficient tensile strength.

Fractures may form in the foam board from either compressive or tensile stresses. Fractures typically propagate from non-laminated board surfaces and from foam panel/facer film interfaces in laminated boards. Compressive stresses occur at a foam panel surface or at an interface between a foam panel surface and a facer film in response to an impact or an external force applied against the surface or interface. When the impact or applied external force places compressive stress on one panel surface or foam/film interface, it simultaneously causes application of tensile stress at a foam panel surface or foam/film interface on an opposing side of the foam board or laminate.

An improved laminated foam insulation board having enhanced strength and resistance to bending and breaking is disclosed in U.S. Pat. No. 5,695,870, assigned to The Dow Chemical Company, the assignee of the present invention. The insulation board includes a panel of a plastic foam material and first and second thermoplastic facers adhered to both primary surfaces of the panel. Each facer has an ultimate elongation of less than (<) 200 percent (%) in both machine and transverse directions, a yield strength of at least ($\geq$) 7,000 pounds per square inch (psi) (48,400 (kilopascals kPa)) in both machine and transverse directions, and a 1% secant modulus $\geq$200,000 psi (1,380 megapascals (mPa)) in both machine and transverse directions. The degree of adhesion between each of the facers and the foam panel is expressed as a peel strength $\geq$100 grams per inch (g/in)(39.4 grams per centimeter (g/cm)). Determine peel strength using a 180° peel test (American Society for Testing and Materials ASTM) test D-903. Suitable films having the required properties include biaxially oriented polyolefin, alkenyl aromatic polymer, polyester, polycarbonate, acrylic polymer, and polyamide films having a thickness of from 0.35 to 10 mils (10 to 250 $\mu$m). The disclosed laminates exhibit significantly improved resistance to bending and breaking as compared with previously known insulation boards with facers that do not have the required elongation, yield strength, and 1% secant modulus.

Biaxially oriented polyolefin films and biaxially oriented polyester films provide laminated insulation foam boards with enhanced strength and resistance to breaking, but do so with an offsetting disadvantage. Only small amounts of these films and polyethylene films can easily be recycled back into foam boards prepared at least in part from an alkenyl aromatic polymer such as polystyrene. The amount of polypropylene, polyethylene or polyester film material present in scrap product often exceeds these small amounts. An attempt to exceed the small amounts adversely affects foam performance. Efforts to maintain foam performance lead to solutions such as discarding a portion of the scrapped product into landfill or removing the polyolefin or polyester film from the laminate to allow recycling of the polystyrene foam only. Discarding scrap product into landfill is undesirable because it increases the ultimate cost of the product by increasing the amount of unused waste materials, and because it adds to the ever-burgeoning amounts of solid waste which are depleting available landfill sites. Separating the excess amounts of polyolefin or polyester films from scrap product is also undesirable because it is relatively difficult and expensive. Other, more recyclable films, such as oriented polystyrene film, have suitable stiffness, but do not impart an impact resistance equivalent to that provided by the biaxially oriented polyolefin and biaxially oriented polyester films.

Accordingly, a need exists for an improved laminated insulating foam board that exhibits both the enhanced board strength and resistance to bending and breaking provided by the biaxially oriented polyolefin and biaxially oriented polyester films and an improvement in recyclability into foams made from alkenyl aromatic polymers relative to laminates made with such biaxially oriented facers.

SUMMARY OF THE INVENTION

The present invention is a laminated insulating foam board comprising a panel of a plastic foam material, and at least one thermoplastic facer adhered to at least one of the primary surface of the panel, the facer comprising a polymer blend containing an alkenyl aromatic polymer or copolymer, and an interpolymer having polymerized therein ethylene, one or more alkenyl aromatic monomers or hindered aliphatic or cycloaliphatic vinylidene monomers and, optionally, one or more copolymerizable olefinic monomers that contain from three to twenty carbon atoms ($C_3$ to $C_{20}$). The foam panel desirably has a thickness within a range of from 6 to 150 millimeters (mm), preferably from one-quarter inch (in) (6.4 mm) to four inches (100 mm). The polymer blend desirably contains from 98 to 30 percent by weight (wt %) alkenyl aromatic polymer and from 2 to 70 wt % interpolymer, both percentages being based on polymer blend weight and totaling 100 weight percent. The facer may be in the form of a continuous film, or in the form of a thin foam sheet. The resulting laminated insulating foam board of the invention exhibits excellent resistance to bending and breaking, and any scrap product can be more easily recycled back into the polyalkenyl aromatic materials used to form the panel of insulating foam without having to remove the facers. The facer preferably has sufficient compatibility with the foam material to allow recycling of the laminated insulating foam board, or components thereof, into the foam panel. A suitable recycle material content for a foam panel is from 1 to 50 percent by weight, based on foam panel weight.

The facer may be in the form of a continuous film or a thin foam sheet.

DESCRIPTION OF THE PREFERRED EMBODIMENTS

Figure 1:
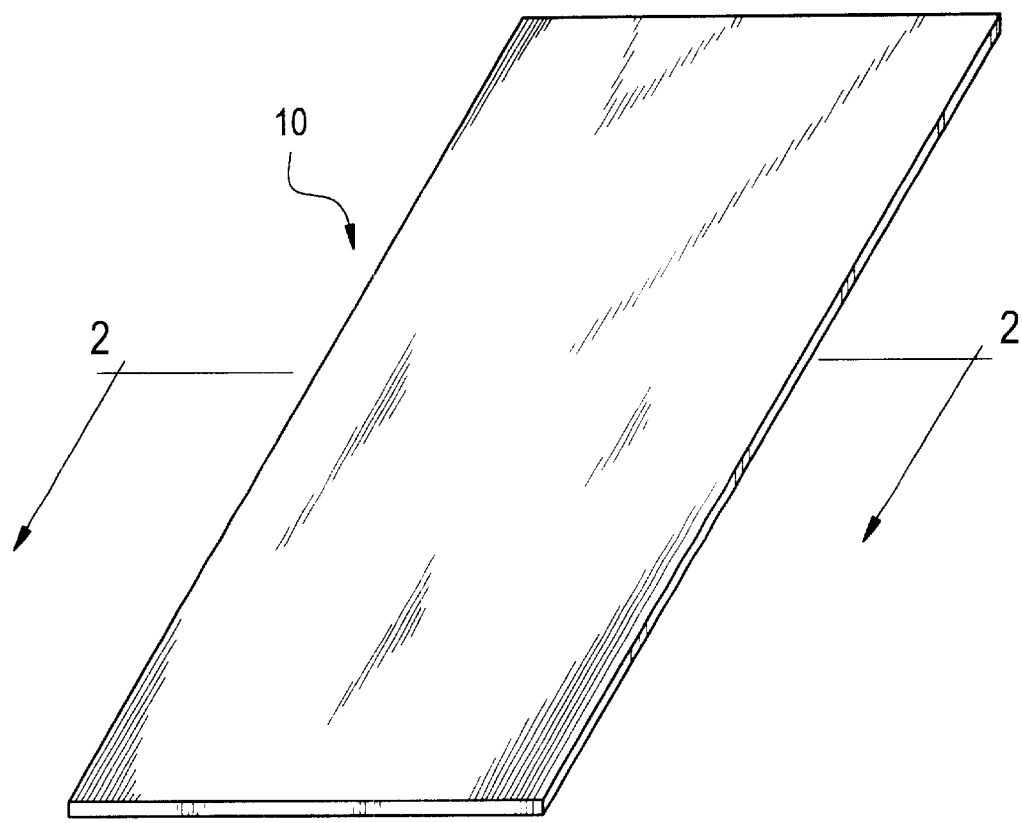
FIG. 1 shows a perspective view of a foam laminate board of the present invention.

FIG. 1 simply shows a schematic illustration, in perspective view, of a laminated insulation foam board 10 suitable for purposes of the present invention. FIG. 1 also shows a section line 2—2 to better illustrate facer placement in FIG. 2.

Figure 2:
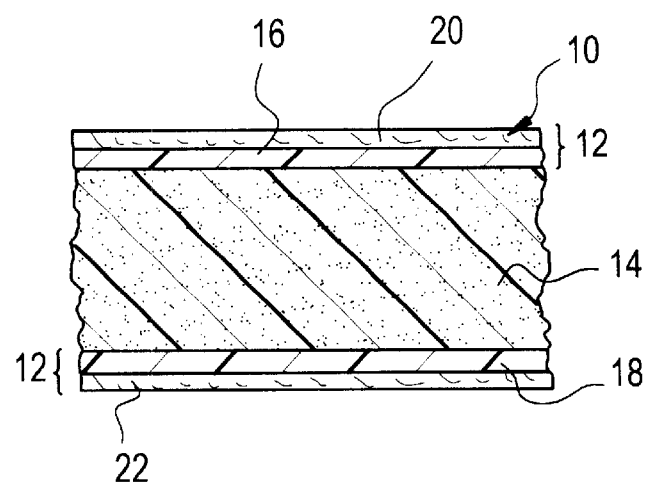
FIG. 2 shows an enlarged, fragmentary, cross-sectional view of the board of FIG. 1 along a line Il—II.

FIG. 2 shows a foam laminate board 10 that comprises a foam core 14 with a first facer 16 adhered or bonded to a one primary surface of foam core 14 and a second facer 18 bonded to a second primary surface of foam core 14. As shown in FIG. 2, the primary surfaces of foam core 14, and consequently first facer 16 and second facer 18, are spaced apart from, and generally parallel to, one another. The laminated foam insulation board 10 exhibits a desirable combination of a substantially improved physical strength and abuse resistance over prior art foam boards that either lack a facer or have a facer that fails to meet performance criteria outlined herein and a greater capacity for recycling into a foamable alkenyl aromatic polymer composition than laminates with a biaxially oriented polyolefin facer or a biaxially oriented polyester facer.

Make laminated foam insulation boards having desirable strength and flexural modulus by laminating a thermoplastic facer that exhibits high tensile strength and low elongation to at least one and preferably both major planar or primary surfaces of a foam panel. The primary surfaces are preferably spaced apart from, and substantially parallel to, each other. The facer preferably exhibits an ultimate elongation of less than (<) 200% in both machine and transverse directions (MD and TD respectively), a yield tensile strength of at least ($\geq$) 4,000 pounds per square inch (psi) (27,600 kilopascals (kPa)) and preferably $\geq$5,000 psi (34,500 kPa) in both MD and TD, and a 1 percent (%) secant modulus $\geq$200,000 psi (1,380 megapascals (mPa)) in both MD and TD. It is believed that facers with such physical properties in both the MD and TD (two dimensions) enable the laminated foam board to withstand a variety of mechanical stresses such as impact, bending and torsion and prevent or substantially reduce the likelihood of fracture propagation at foam panel/facer interfaces. Measure physical properties of a facer prior to lamination according to ASTM D-882.

Facers with insufficient yield strength tend to exhibit tensile elongation in response to applied stress. When such a facer is laminated to a foam substrate and the resulting laminate is subsequently subjected to a substantial impact or stress, the laminate will bend to a point where the foam panel begins to fracture at the facer/foam panel interface. Continued stress application causes the facer to elongate over the fracture at the interface and allows fracture propagation to continue, ultimately resulting in board failure. Facers with high yield strength and low elongation characteristics substantially inhibit and, preferably, prevent laminated foam board failure. Sufficient facer secant modulus, or stiffness, enhances the overall flexural modulus of the board.

In one aspect of the invention, the facers are thermoplastic facer films comprising a blend of (a) an alkylene aromatic polymer and (b) an interpolymer that has polymerized therein ethylene, one or more alkenyl aromatic monomers or hindered aliphatic or cycloaliphatic vinylidene monomers, and, optionally, one or more copolymerizable $C_3$ to $C_{20}$ olefinic monomers.

The alkenyl aromatic polymer, preferably polystyrene homopolymer, has a melt flow rate (MFR) (ASTM D-1238, Condition G (200° C., 5 kg weight)) that is desirably 0.5 to 20 decigrams/minute (dg/min), preferably 0.8–10 dg/min and most preferably 1–2 dg/min.

U. S. Pat. No. 5,872,201, the teachings of which are incorporated herein by reference, describes such interpolymers and their preparation. Useful interpolymers include those with an alkenyl aromatic monomer or a hindered aliphatic vinylidene monomer content of from 25 to 80 wt %. The content is of preferably from 30 to 77 wt %, more preferably from 35 to 75 wt %. Preferred interpolymers, sometimes referred to as etlylene/styrene interpolymers or ESI resins, for use in preparing the facer films of this invention are interpolymers of ethylene, styrene, and, optionally, one or more copolymerizable $C_3$ to $C_{20}$ olefinic monomers. Preferred ESI resins have a polymerized styrene content that is desirably from 25 to 80 wt %, preferably from 30 to 77 wt %, and more preferably from 35 to 75 wt %. The interpolymer, preferably an ESI resin, has a melt index ($I_2$) of from 0.05 to 1,000 decigrams per minute (dg/min), preferably from 0.1 to 100 dg/min, and more preferably from 0.2 to 50 dg/min, measured in accordance with ASTM D-1238, condition D, (190° C./2.16 kilogram (kg) weight). The interpolymers, preferably ESI resins, may contain up to 30 wt %, based on interpolymer weight, atactic polystyrene.

The polymer or resin blend used to prepare the facers of this invention suitably comprises from 2 to about 70 wt % interpolymer, preferably an ESI resin, and from 98 to about 30 wt % alkenyl aromatic polymer, both percentages being based on blend weight and totaling 100 wt %. The blend interpolymer content desirably ranges from 5 to 60 wt %, more preferably from 10 to 50 wt %, and most preferably from 25 to about 50 wt %. The corresponding blend alkenyl aromatic polymer contents range from 95 to 40 wt %, more preferably from 90 to 50 wt % and most preferably from 75 to 50 wt %. In each instance, the weight percentages are based on blend weight.

Suitable alkenyl aromatic polymers include alkenyl aromatic homopolymers and copolymers of alkenyl aromatic compounds or monomers and a copolymerizable ethylenically unsaturated comonomer such as acrylic acid, methacrylic acid or acrylonitrile. The alkenyl aromatic polymer has an alkenyl aromatic monomer unit content that is preferably greater than (>) 50 wt %. more preferably >70 wt %, based on total polymer weight. Most preferably, the alkenyl aromatic monomer content is 100 wt % as in polystyrene homopolymer. Suitable alkenyl aromatic monomers include, for example, styrene, alphamethyl styrene, vinyl toluene, t-butyl styrene, and chlorostyrene.

The facers or films suitable for use in accord with this invention may be made by any known procedure. Such procedures include a blown orientation process and a cast tenter process.

In another embodiment, the facer is a thin foam sheet rather than a film. The thin foam sheet preferably has the same polymer composition as the facer film. Skilled artisans understand that foam preparation requires use of a blowing or expansion agent and, in some cases, a nucleating agent. The thin (typically 0.05 to 0.1 inch or 0.13 to 0.25 cm) foam sheet may be prepared via conventional foam extrusion or MEPS foam procedures on conventional apparatus. The thin foam sheet simply replaces one or more of the facer films. The thin foam sheet facer may be a monolayer structure or a multilayer structure. In a multilayer structure, the thin foam sheet may be a laminate of two or more foam sheets, with or without a surface film layer adhered to one or both sides of the sheet. A sheet co-extrusion process may be used to make the multilayer structures. The surface film layers need not be of the same polymer composition as the foam sheet. The thin foam sheet facer also improves the insulation performance of the alkenyl aromatic polymer foam.

The facer film may be in the form of a monolayer film, a co-extruded multilayer film, or a coated multiple-layer film. The facer film has a thickness that ranges from 0.35 to about 10 mils (9 to about 250 µm), preferably from 0.5 to 3.0 mils (13 to 75 µm).

For the thin foam sheet facers, either physical or chemical blowing agents may be used in an amount of from 0.2 to 5.0, preferably from 0.5 to 3.0, and most preferably from 1.0 to 2.5 gram-moles of blowing agent per kilogram (gm-m/kg) of polymer. Additives such as antioxidants, pigments, fire retardants, and the like, may be added to the foams. The thin foam sheet facers have a density that is desirably less than (<) 250 kilograms per cubic meter ($kg/m^3$), preferably <150 $kg/m^3$, and most preferably from 5 to 70 $kg/m^3$. The thin foam sheet facers have a cell size that is desirably from 0.05 to 5 mm, preferably from 0.1 to 2 mm, and most preferably from 0.2 to 1.8 mm, as determined in accordance with ASTM D3576. The thin foam sheet facers may be open or closed cell, as determined in accordance with ASTM D2856. The thin foam sheet facers have a thickness that is desirably from >0 mm, but less than or equal ($\leq$) to 7 mm, preferably $\leq$5 mm, and most preferably $\leq$3 mm.

The facer (facer film or thin foam sheet facer) may be laminated to the foam board by any conventional method known in the art. Useful lamination methods include hot roll lamination of a heat activated adhesive layer on the facer. Liquid coating or spray coating a hot melt adhesive or liquid-base adhesive onto the facer or foam board prior to lamination also yields satisfactory results. A hot melt adhesive may also be extruded onto the facer or foam prior to lamination. The facer may be co-extruded with an adhesive layer, and subsequently laminated to the foam board.

The degree of adhesion between the facer and foam panel is sufficient to ensure adhesion during impact or bending. Separation or slipping between the facer and foam panel at their interface negates the strengthening effect of the facer. The degree of adhesion between the facer and the foam board is preferably such that any failure occurs within the foam rather than in the facer or at an interface between the foam and the facer upon bending of the laminate board. The degree of adhesion is preferably strong enough that part or all of the skin of the foam can be pulled off the remainder of the foam when the facer is peeled off the foam. The adhesive must adhere to both the facer and the foam panel substrate. The degree of adhesion is expressed as a peel strength that is determined in accordance with the 180 degree (180°) peel test described in ASTM D-903. The peel strength is desirably $\geq$100 grams per inch (gm/in) ($\geq$39.4 grams per centimeter (gm/cm)) and preferably $\geq$250 gm/in ($\geq$98.5 gm/cm).

Suitable materials for use as adhesives or in adhesive layers include those adhesive materials known in the art as useful with plastic films and foams. Illustrative materials include polyolefin copolymers such as ethylene/vinyl acetate (EVA), ethylene/acrylic acid (EAA), ethylene/n-butyl acrylate (EnBA), ethylene/methylacrylate (EMA), ethylene ionomers, and ethylene or propylene polymers grafted with an anhydride. Other useful adhesives include, without limit, urethanes, copolyesters and copolyamides, styrene block copolymers such as styrene/butadiene (SB) and styrene/isoprene polymers (SI), and acrylic polymers. The adhesives may be thermoplastic or curable thermoset polymers, and can include tacky, pressure-sensitive adhesives. The adhesive or adhesive layers is preferably recyclable within the foam board manufacturing process. The adhesive material preferably has no significant negative impact upon foam physical integrity or foam physical properties.

The foam panel or foam core stock of the present foam board may take the form of any insulation foam known in the art such as extruded polystyrene foam, MEPS foam, extruded polyolefin foam, expanded polyolefin bead foam, polyisocyanurate foam, and polyurethane foam. Polyolefin foams useful as the foam panel include homopolymers and copolymers of ethylene and propylene as well as a wide variety of blends with one or more of such homopolymers and copolymers. The panel has a thickness that is desirably from 6 to 150 mm, preferably from 6.4 to 100 mm.

The present invention is particularly useful with extruded polystyrene foam and MEPS foam. Such foams are readily recyclable, and the thermoplastic facer films and adhesive materials used in preparing the laminated insulating foam boards are readily recyclable with the foams. "Recyclability" means the foams can be ground into scrap material that can be melted and processed with virgin polymer materials, blowing agents, and additives to form new foams. Further, the attractive appearance of the foams can be maintained by using transparent facer films and adhesive materials. The facer films also substantially enhance the strength of thin polystyrene foam boards useful in insulation sheeting applications, particularly those boards having a thickness of from ¼ inch to 4 inches (6.4 mm to 100 mm).

Polystyrene foams may be derived from conventional alkenyl aromatic polymer materials. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may comprise one or more alkenyl aromatic homopolymers, one or more alkenyl aromatic copolymers, a blend of one or more alkenyl aromatic homopolymers and one or more alkenyl aromatic copolymers, or a blend of any of the foregoing with a non-alkenyl aromatic polymer. Regardless of composition, the alkenyl aromatic polymer material desirably comprises >50, preferably >70 wt %, based on alkenyl aromatic polymer material weight, alkenyl aromatic monomer units. Most preferably, the alkenyl aromatic polymer material is comprised entirely of alkenyl aromatic monomer units.

Suitable alkenyl aromatic polymers include those derived from alkenyl aromatic compounds such as styrene, alphamethylstytrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred foams have a polymer content that comprised substantially (i.e., >95 wt %), and most preferably entirely, of polystyrene.

Extruded polymer foam preparation generally involves heating a polymer material to form a plasticized or melt polymer material, incorporating therein a blowing agent to form a foamable gel, and extruding the gel through a die to form the foam product. Heating the polymer material to a temperature at or above its glass transition temperature or melting point typically precedes blowing agent addition. Blowing agent incorporation into or admixture with a polymer melt material may use any means known in the art such as with an extruder, mixer, or blender. Mix the blowing agent with the polymer melt material at an elevated pressure sufficient to prevent substantial expansion of the polymer melt material and to generally disperse the blowing agent homogeneously therein. Optionally, blend a nucleator in the polymer melt or dry blend the nucleator with the polymer material prior to plasticizing or melting. Typical procedures cool the foamable gel to a lower temperature to optimize physical characteristics of the foam structure. Gel cooling may occur in the extruder or other mixing device or in separate coolers. Extrude or conveyed the foamable gel through a die of desired shape to a zone of reduced or lower pressure to form the foam structure. The zone of lower pressure is at a pressure lower than that in which the foamable gel is maintained prior to extrusion through the die. The lower pressure may be superatmospheric, subatmospheric (evacuated or vacuum), or at an atmospheric level.

From MEPS foams by expanding pre-expanded beads that contain a blowing agent. Mold the expanded beads at the time of expansion to form articles of various shapes. Processes for making pre-expanded beads and molded expanded bead articles are taught in *Plastic Foams, Part II*, Frisch and Saunders, pp. 544–585, Marcel Dekker, Inc. (1973) and *Plastic Materials*, Brydson, 5th ed., pp. 426–429, Butterworths (1989), the teachings of which are incorporated herein by reference.

Thermoplastic facer films, while particularly useful for lamination to polystyrene foam boards, also yield enhanced strength when laminated to polyisocyanurate and polyurethane foam boards.

Prepare polyurethane and polyisocyanurate foam structures by reacting two formulated components, commonly called an A-component and a B-component. The formulated components comprise an isocyanate and a polyol.

Polyurethane foam preparation involves a reaction between a polyol and a isocyanate on a 0.7:1 to 1.1:1 equivalent basis. Polyisocyanurate foam preparation includes a reaction between a polyisocyanate and a minor amount of polyol to provide 0.10 to 0.70 hydroxyl equivalents of polyol per equivalent of polyisocyanate. U.S. Pat. No. 4,795,763, the teachings of which are incorporated herein, discloses useful polyurethanes and polyisocyanurates as well as their preparation.

Blowing agent selection is not critical to the present invention. Blowing agents useful in making a foam board vary depending upon the composition of the foam and can include inorganic blowing agents, organic blowing agents and chemical blowing agents. Suitable inorganic blowing agents include carbon dioxide, argon, and water. Organic blowing agents include aliphatic hydrocarbons having 1–9 carbon atoms ($C_{1-9}$). $C_{1-3}$ aliphatic alcohols, and fully and partially halogenated $C_{1-4}$ aliphatic hydrocarbons. Particularly useful blowing agents include n-butane, isobutane, n-pentane, isopentane, ethanol, chlorodifluoromethane (HCFC-22), 1,1-difluoroethane (HFC-152a), 1,1,1,2-tetrafluoroethane (HFC-134a), ethyl chloride, 1,1-dichloro-1-fluoroethane (HFC-141b), and 1-chloro-1,1-difluoroethane (HCFC-142b).

The foam board may have incorporated therein one or more additives such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium dioxide, silica, barium stearate, diatomaceous earth, mixtures of citric acid and sodium bicarbonate, and the like. The amount of nucleating agent employed may range from 0.01 to 5 parts by weight per hundred parts by weight of a polymer resin (phr). The preferred range is from 0.1 to 3 phr.

Suitable polystyrene foam densities range from 10 kilograms per cubic meter ($kg/m^3$) to 150 $kg/m^3$, preferably from 10 $kg/m^3$ to 70 $kg/m^3$ (ASTM D-1622-88). The polystyrene foam average cell size ranges from 0.1 mm to 5 mm, preferably from 0.15 mm to 1.5 mm (ASTM D3576-77).

The polyisocyanurate foams and polyurethane foams have a density range of from 10 $kg/m^3$ to 150 $kg/m^3$, preferably from 10 $kg/m^3$ to 70 $kg/m^3$ (ASTM D-1622-88). The polyisocyanurate foam and polyurethane foam average cell size ranges from 0.05 mm to 5.0 mm, preferably from 0.1 mm to 1.5 mm (ASTM D3576-77).

The polystyrene foams may be closed cell or open cell, but are preferably closed cell, more preferably with a closed cell content >90% (ASTM D2856-87).

The laminated insulating foam board of the present invention may be used to insulate a surface or an enclosure or building by applying the board to the same. Other useful insulating applications include in roofing and refrigeration. The laminated insulating foam boards may be part of a wall, roof, floor or door construction that includes one or more other materials such as wood, concrete, metal, glass and plastic. The boards may also be part of a utilitarian device such as a body board, surfboard, snowboard, ski, roller board, or flotation device. Skilled artisans can readily expand this list to include other known foam applications.

During the manufacture of such foam boards, scrap product may be produced. It is desirable to regrind this scrap and recycle it back into the process to make more boards of high quality foam insulation. The amount of recycled material contained in foam boards or panels used in preparing laminated insulating foam boards of the present invention preferably ranges from 1 to 50 wt %, more preferably from 1 to 30 wt %, and still more preferably from 3 to 20 wt %, based on foam panel weight.

The following examples illustrate, but do not limit, the present invention. Unless otherwise indicated, all percentages, parts, or proportions are by weight.

EXAMPLE (EX) 1

Use an oriented blown film process to convert a blend of 50 wt % of an ESI resin and 50 wt % of a polystyrene resin, both percentages being based on blend weight, into a thin (2 mil or 50 µm) film with balanced tensile and elongation properties. The film has a MD yield tensile of 5000 psi (34,500 kPa), a TD tensile yield of 4500 psi (31,000 kPa), a MD ultimate elongation of 95%, a TD ultimate elongation of 80%, a MD 1% secant modulus of 200,000 psi (1400 mPa) and a TD 1% secant modulus of 155,000 psi (1050 mPa).

The ESI resin, prepared using a metallocene catalyst such as (1H-cyclopenta[1]-phenanthrene-2-yl)dimethyl(t-butylamido)-silanetitanium 1,4-diphenylbutadiene) together with a co-catalyst such as tris-pentafluorophenyl borane and a scavenger such as modified methylalumoxane. ESI preparation includes polymerizing a mixture of polymerizable monomers in the presence of one or more metallocene or constrained geometry catalysts in combination with various cocatalysts, as described in EP-A-0,416,815 and U.S. Pat. No. 5,703,187, both of which are incorporated herein by reference in their entirety. The ESI resin has polymerized therein 70 wt % styrene and 30 wt % ethylene, both percentages being based on resin weight. The ESI (INDEX* DS 201.01, a developmental resin of The Dow Chemical Company) resin has a melt index ($I_2$) (ASTM D1238, Condition E (190° C./2.16 kg weight)) of 1.0 dg/min and a specific gravity of 1.017.

The polystyrene resin (STYRON*665, The Dow Chemical Company) has a MFR of 1.5 dg/min, a weight average molecular weight ($M_w$) of 305,000 and a molecular weight distribution ($M_w$/number average molecular weight ($M_n$) or $M_w/M_n$) of 2.6. STYRON and INDEX are trademarks of The Dow Chemical Company.

Laminate the film to freshly-extruded, 0.56 in (14 mm) polystyrene foam (STYROFOAM® brand insulation) using an oil heated hot roll at 190° C. and a line speed of 38 meters per minute to give a laminate with a smooth film surface on both sides. The film adheres to the foam with a peel strength of 120 g/cm, as measured on an Instron tensile tester (ASTM D 903).

Test the resulting laminate by nailing it to a wood stud wall panel and having an individual attempt to walk on the foam, putting one's weight between the studs. The laminate has sufficient stiffness to support the weight of a 90 kg person. The same foam without facers does not support the weight of a 50 kg person.

Test the laminate by supporting it in a horizontal position over an open framework, and then dropping a 1.9 kg steel ball onto the foam from a distance of 14 cm above the foam. The foam laminate does not break after three such ball drops onto the same spot, whereas a control foam without facers breaks after a single drop of the ball onto the foam from a distance of 7 cm.

EX 2

Replicate EX 2, but change the blend ratio to 65 wt % polystyrene resin and 35 wt % ESI resin, both percentages being based on blend weight, and reduce the film thickness to 1.5 mil (38 µm). The film has a MD yield tensile of 6500 psi (44,800 kPa), a TD tensile yield of 6200 psi (42,800 kPa), a MD ultimate elongation of 55%, a TD ultimate elongation of 60%, a MD 1% secant modulus of 275,000 psi (1900 mPa) and a TD 1% secant modulus of 265,000 psi (1800 mPa). The laminate has excellent peel strength.

EX 3

Extrude two thin (3 mm thick), 6 pound per cubic foot (96 $kg/m^3$) foams. One foam, used as a control, has a polymer content that is 100 wt % polystyrene. The other foam has a polymer content that consists of 75 wt % polystyrene and 25 wt % of the same ESI resin as in EX 1, both percentages being based on total polymer weight.

Use a pressure sensitive adhesive to prepare laminates by bonding the thin foams to both sides of 0.5 inch (1.3 cm) thick STYROFOAM® brand insulation panel. The laminate with the control polystyrene thin foam on both sides is stiff, but brittle, and breaks when bent. The laminate using the ESI-containing thin foam feels stiffer than the foam panel, but can be folded in half without breaking the laminate. The foam panel with no thin foam facer breaks in response to an attempt to fold it in half.

The enhanced strength demonstrated in EX 1 and EX 2 and improved ability to bend demonstrated in EX 3, all with reference to a non-laminated foam, has practical value, particularly in terms of reducing damage to foam panels in the home insulation market, where sheet of foam may be subjected to bending, flexing during handling and installation.

The laminated foam insulating boards of EX 1–3 can be ground and recycled into a new foam panel at a level where comparable foam insulating boards with an oriented polypropylene facer (65% by volume OPP layer and 35% by volume EVA adhesive layer) would result in foam panel surface defects. A possible source of surface defects lies in the known incompatibility of polyolefins, such as PP, with alkenyl aromatic polymers, such as polystyrene.

While the Examples and specifications provide specific details about embodiments of the laminate foam board of the present invention, skilled artisans understand that the present invention may be modified by various changes while still being fairly within the scope of the novel teachings and principles herein set forth. Such changes may stem from, for example, manufacturers' choice of process conditions, materials or both.

What is claimed is:

1. A laminated insulating foam board comprising:
   a panel of a plastic foam material, the panel having at least two primary surfaces; and
   at least one facer adhered to a primary surface of the panel, the facer comprising a polymer blend containing from 98 to 30 percent by weight of an alkenyl aromatic polymer, and from 2 to 70 percent by weight of an interpolymer having polymerized therein ethylene, one or more alkenyl aromatic monomers or hindered aliphatic or cycloaliphatic vinylidene monomers, and optionally one or more copolymerizable olefinic monomers that contain from 3 to 20 carbon atoms, both percentages being based on polymer blend weight and totaling 100 weight percent.

2. The laminated insulating foam board of claim 1, wherein the interpolymer has polymerized therein from 25 to 80 percent by weight of an alkenyl aromatic monomer or a hindered aliphatic vinylidene monomer.

3. The laminated insulating foam board of claim 1, wherein the interpolymer has polymerized therein from 30% to 77% by weight of an alkenyl aromatic monomer or a hindered aliphatic vinylidene monomer.

4. The laminated insulating foam board of claim 1, wherein the vinyl aromatic monomer is styrene.

5. The laminated insulating foam board of claim 1, wherein the polymer blend contains from 5 to 60 percent by weight of the interpolymer and from 95 to 40 percent by weight of alkenyl aromatic polymer, both percentages being based on polymer blend weight and totaling 100 weight percent.

6. The laminated insulating foam board of claim 1, wherein the polymer blend contains from 10 to 50 percent by weight of the interpolymer and from 90 to 50 percent by weight of alkenyl aromatic polymer, both percentages being based on polymer blend weight and totaling 100 weight percent.

7. The laminated insulating foam board of claim 1, wherein the polymer blend contains from 25 to 50 percent by weight of the interpolymer and from 75 to 50 percent by weight of alkenyl aromatic polymer, both percentages being based on polymer blend weight and totaling 100 weight percent.

8. The laminated insulating foam board of claim 1, wherein the panel has a thickness of from 6 millimeters to 150 millimeters.

9. The laminated insulating foam board of claim 1, wherein the panel has a thickness of from one-quarter inch (6.4 millimeters) to four inches (100 millimeters).

10. The laminated insulating foam board of claim 1, wherein the foam panel comprises a foam material selected from extruded polystyrene foam, molded expanded polystyrene foam, extruded polyolefin foam, polyisocyanurate foam, and polyurethane foam.

11. The laminated insulating foam board of claim 1, wherein the foam panel contains from 1 to 50 percent by weight, based on foam panel weight, recycled material.

12. The insulating foam board of claim 1, wherein the facer is a film having a thickness of from 0.35 mils (9 micrometers) to 10 mils (250 micrometers).

13. The laminated insulating foam board of claim 1, wherein the facer is a foam sheet having a thickness of from greater than 0 millimeter up to and including 7 millimeters.

* * * * *